United States Patent [19]

Herold

[11] Patent Number: 5,078,983

[45] Date of Patent: Jan. 7, 1992

[54] PROCESS FOR PRODUCING DAWSONITE

[75] Inventor: Gunther Herold, Karlsruhe, Fed. Rep. of Germany

[73] Assignee: Universitat Karlsruhe, Karlsruhe, Fed. Rep. of Germany

[21] Appl. No.: 508,179

[22] Filed: Apr. 12, 1990

[30] Foreign Application Priority Data

Apr. 21, 1989 [DE] Fed. Rep. of Germany ....... 3913243

[51] Int. Cl.$^5$ .................... C01B 31/24; C01B 7/00; A61K 33/06; A61K 33/10
[52] U.S. Cl. ........................... 423/419 P; 423/266; 423/421; 423/422; 423/625; 424/686
[58] Field of Search .............. 423/419 P, 629, 625, 423/266, 421, 422; 424/686, 688

[56] References Cited

U.S. PATENT DOCUMENTS

| | | | |
|---|---|---|---|
| 3,024,088 | 3/1962 | Palmqvist et al. | 423/419 P |
| 3,423,172 | 1/1989 | Cafferata | 423/266 |
| 3,796,794 | 3/1974 | Ilardi | 423/421 |
| 4,221,771 | 9/1980 | van der Heem | 423/419 P |
| 4,221,772 | 9/1980 | Eisenmenger et al. | 423/445 |
| 4,238,458 | 12/1980 | Misra | 423/115 |
| 4,356,157 | 10/1982 | Altman | 423/419 P |
| 4,438,085 | 3/1984 | Kaufman | 423/419 P |

FOREIGN PATENT DOCUMENTS

| | | |
|---|---|---|
| 3212799 | 11/1983 | Fed. Rep. of Germany . |
| 10464 | 1/1980 | Japan ............... 423/419 P |
| 02728 | 10/1981 | World Int. Prop. O. . |

OTHER PUBLICATIONS

"Synthesis and Characterization of Dawsonite", Jackonp et al., Bureau of Mines Report 7664, 1979.
Bonsignore, *Plastics Engineering*, 1976, pp. 41-43.
*Grant & Hackh's Chemical Dictionary*, 5th Edition, McGraw Hill Book Co., Inc., 1987, pp. 160-161, 313.
Industrial Safety, Technical Rules for Hazardous Materials, Report of the Federal Minstry of Labor, IIb 4-35125-5, (Sep. 10, 1987); pp. 72 to 75.

*Primary Examiner*—Michael Lewis
*Assistant Examiner*—Stephen G. Kalinchak
*Attorney, Agent, or Firm*—Fisher, Christen & Sabol

[57] ABSTRACT

A process for producing a dawsonite with a short-prismatic, isometric crystal habit. The dawsonite can be produced without occupational medicine concerns and can be used as, among other things, a flame-retardant additive in plastics.

19 Claims, 2 Drawing Sheets x 10,000

×10,000

PROCESS FOR PRODUCING DAWSONITE

BACKGROUND OF THE INVENTION

1. Field of the Invention

The invention relates to a process for producing a dawsonite with a short-prismatic, isometric crystal habit.

2. Background Art

Dawsonite is a naturally occurring mineral having the formula $NaAl(OH)_2CO_3$ and which crystallizes orthorhombically with an acicular habit. Because of its chemical and thermal properties, dawsonite is usable as a flame retardant material, for example, in plastics. Therefore, there has been no lack of processes for synthetically producing dawsonite, for example, U.S. Pat. No. 4,221,771, German PS 3,212,799 or WO 81/02728. But a great disadvantage is that even the dawsonite synthesized according to these known processes exhibits an acicular habit. Therefore, for the dust occurring in the manufacturing techniques the TRK value for fibrous dust must be used. Particles with a length greater than 5 micrometers and a diameter of less than 3 micrometers, in a ratio of length to diameter of at least 3 : 1, are considered to be fibers (Arbeitsschutz. Technical Reoeln fuer Gefahrstoffe [Industrial Safety, Technical Rules for Hazardous Materials]. Ber. des BMA [Report of the Federal Ministry of Labor] of Sept. 10, 1987, IIIb 4-35125-5). For toxicological reasons and reasons related to occupational medicine, based on experience with asbestos, processes yielding fibrous dust are therefore extremely unsuitable and are to be avoided.

BROAD DESCRIPTION OF THE INVENTION

An object of the invention is to provide a method of production which produces a dawsonite with a short-prismatic habit that is harmless from the standpoint of occupational medicine. Another object of the invention is to provide such a process wherein the synthesis takes place with a short reaction time, with a high yield and without any accumulation of unwanted or risky by-products. A further object of the invention is to provide such a the dawsonite product having high thermal stability.

The objects of the invention are achieved by the process and product of the invention.

The basic reactions of the process according to the invention are the reaction of aluminum hydroxide with sodium carbonate and/or sodium bicarbonate according to:

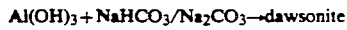

$Al(OH)_3 + NaHCO_3/Na_2CO_3 \rightarrow$ dawsonite or the reaction of a sodium aluminate solution with urea and/or sodium carbonate and/or sodium bicarbonate as the carbonate supplier. By the addition of a hydroxycarboxylic acid and/or one of its salts to the respective reaction, surprisingly a change in the crystal habit is obtained.

By hydroxycarboxylic acids are meant $C_1-C_4$ alkane monocarboxylic acids, $C_1-C_4$ alkane dicarboxylic acids or alkane tricarboxylic acids, which are substituted with 1 to 2 hydroxy groups. Advantageous representatives from this group are citric acid, malic acid, tartaric acid and their salts. Particularly suitable is citric acid. It is quite possible to use mixtures of the above-mentioned hydroxycarboxylic acids and/or their salts.

The quantity of the corresponding hydroxycarbonxylic acids that is added has a significant influence on the crystal form of the resultant dawsonite. It has proven useful to add 5 to 200 percent of the appropriate hydroxycarboxylic acid per unit of weight of aluminum of the aluminum compound used. Preferred is an addition in the range of 5 to 100 percent per unit of weight of aluminum, and optimum results are obtained in the range of additions of 10 to 20 percent per unit of weight of the aluminum.

A further advantage of the invention is that the hydroxycarboxylic acid that is used is not consumed and, therefore, after the reaction is ended and the dawsonite is separated in dissolved form, it can be made available for further reactions in the invention process.

Furthermore, it has proven useful to perform the reactions in a temperature range of from 150° to 220° C. over a period of at least 3 hours. Preferably it is performed at 170° to 190° C. for a period of from 3 to 5 hours.

If the reaction of a sodium aluminate solution with sodium carbonate and/or with sodium bicarbonate forms the basic reaction, because of the high alkalinity of the initial solution the reaction should be buffered for the purpose of obtaining a high yield. For this purpose the combinations urea/sodium bicarbonate or sodium carbonate/sodium bicarbonate or sodium carbonate/ammonium chloride are suitable.

It is also suitable to reduce the pH of the aluminate liquor before the beginning of the test to pH 10 to 12 by a corresponding addition of acid (hydrochloric acid), and the supply of the carbonate takes place by sodium carbonate and/or sodium bicarbonate.

Suitably in this reaction system a sodium aluminate solution is used which is formed from an aluminum hydroxide, preferably gibbsite, and an aqueous sodium hydroxide solution, for example, 1.8 to 3.6 m NaOH. For this purpose 25 to 50 g of $Al(OH)_3$ is dissolved per liter of sodium hydroxide solution of the above molarity. The higher the molarity of the sodium hydroxide solution, the larger the quantities of aluminum hydroxide that can be brought into solution.

The carbonate-suppliers urea, sodium carbonate or sodium bicarbonate can be used individually or in mixture with one another, and then in the solution there must be present a carbonate concentration which corresponds to at least as great as 1.5 m, preferably 2 to 5 m, sodium carbonate solution. Preferably before the reaction the pH is reduced to 10 to 12 with an appropriate addition of acid and as a carbonatesupplier sodium carbonate and/or sodium bicarbonate is used, or else without a reduction of the pH a combination of sodium carbonate/urea is selected which functions as a buffer and carbonate-supplier.

If the reaction of an aluminum hydroxide with sodium carbonate and/or sodium bicarbonate forms the basic reaction, the following educt conditions have proven advantageous. As an aluminum hydroxide preferably gibbsite is used which is reacted with at least the theoretical quantity of an at least 1.5 molar, preferably 2 to 5 molar, aqueous solution of sodium carbonate and/or an at least 1.5 molar, preferably 2 to 5 molar, aqueous solution of sodium bicarbonate under the above conditions. Here the theoretical quantity with the use of 1.5 molar sodium carbonate solution corresponds to a ratio of the weight of sodium carbonate to aluminum hydroxide of 6.6 to 1.

Particularly preferred for this type of reaction is the reaction of gibbsite with a 2 to 5 molar aqueous solution of sodium carbonate and a 2 to 5 molar aqueous solution of sodium bicarbonate.

It is advantageous to buffer the reaction by the addition of urea in particular.

According to the process of the invention, dawsonite can be produced in nearly quantitative yields with a shortprismatic isometric habit (length of the crystals in the range of 0.1 to 2 micrometers). Obviously it is also possible to produce larger crystals or also crystals smaller than 0.1 micrometers. Since with decreasing crystallinity the thermal properties also become significantly course, such products are not of interest for incorporation into plastics.

For an industrial scale production according to the process of the invention, there are no longer any occupational health and toxicological concerns of the above-noted type.

DETAILED DESCRIPTION OF THE INVENTION

Figure 1:
FIG. 1 is a photograph ($\times 10,000$) of a short-prismatic isometric dawsonite, produced from gibbsite and aqueous 2 m $HaHCO_3$ and aqueous 2 m $Na_2CO_3$ with the addition of 100 mg of citric acid at 180° C. over 4 hours according to Example 3 (basic reaction 1).
Figure 2:
FIG. 2 is a photograph ($\times 10,000$) of a short-prismatic isometric dawsonite, produced from a sodium aluminate solution [25 g of $Al(OH)_3$ in 1.8 m NaOH]and 4 g of $NaHCO_3$ and 4 g of $Na_2CO_3$ with the addition of 50 mg of citric acid at 180° C. for 4 hours according to Example 8 (basic reaction 2).

Examples (1) Basic reaction: $Al(HO)_3 + NaHCO_3/N_{a2}CO_3$

In an autoclave, 1.45 g of gibbsite was stirred with 30 ml of $NaHCO_3$ solution (2 m in $H_2O$), 30 ml of $Na_2CO_3$ solution (2 m in $H_2O$) and the respective hydroxycarboxylic acid (see Table I) at 180° C. for 4 hours.

TABLE I

| Example | Additive | pH | Yield | Remarks |
|---|---|---|---|---|
| 1 | 1000 mg ZS | 9.6 | 65% | Contaminated with boehmite |
| 2 | 500 mg ZS | 9.8 | 87% | |
| 3 | 100 mg ZS | 9.8 | 95% | |
| 4 | 50 mg ZS | 9.9 | 98% | |
| 5 | 25 mg ZS | 9.7 | 100% | |
| 6 | 10 mg ZS | 9.7 | 100% | Columnar habit |
| 7 | 1000 mg WS | 9.6 | kl.50% | High proportion of boehmite |
| 8 | 300 mg WS | 9.8 | 93% | |
| 9 | 100 mg WS | 9.8 | 96% | |
| 10 | 50 mg WS | 9.7 | 99% | |
| 11 | 25 mg WS | 9.9 | 100% | |
| 12 | 100 mg Na-tartrate | 9.9 | 96% | |
| 13 | 50 mg Na-citrate | 9.7 | 95% | |
| 14 | 2000 mg AS | 9.5 | 80% | High proportion of gibbsite |
| 15 | 70 mg ZS | 9.8 | 97% | |
| 16 | 70 mg ZS | 9.8 | 95% | 1.75 g $Al(OH)_3$, 2.4 m $Na_2CO_3/NaHCO_3$ |
| 17 | 70 mg ZS | 9.8 | 96% | 2.00 g $Al(OH)_3$, 2.8 m $Na_2CO_3/NaHCO_3$ |
| 18 | 70 mg ZS | 9.9 | 95% | 2.25 g $Al(OH)_3$, 3.1 m $Na_2CO_3/NaHCO_3$ |
| 19 | 70 mg ZS | — | 96% | |
| 20 | 70 mg ZS | — | 98% | |
| 21 | — | 9.7 | 96% | (The filtrates of Examples 19 and 20 were used without additions of citric acid) |

Notes:
ZS is citric acid
WS is tartaric acid
AS is malic acid (2) Basic reaction: Na-aluminate solution + $NaHCO_3$. $NaCO_3$/urea In an autoclave, 60 ml of Na aluminate solution (25 g of gibbsite in 1 l of 1.8 m NaOH) at 180° C. was stirred with the specified additives for 3 to 4 hours.

TABLE II

| Example | Additive | pH | Yield |
|---|---|---|---|
| 1 | 100 mg ZS + 8 g $NaHCO_3$ + 2 g urea | 11.3 | 97% |
| 2 | 200 mg ZS + 10 g $NaHCO_3$ + 1 g urea | 11.0 | 95% |
| 3 | 200 mg ZS + 10 g $NaHCO_3$ + 2 g $NH_4Cl$ | 11.6 | 92% |
| 4 | 50 mg ZS + 8 g $NaHCO_3$ + 2 g urea | 11.2 | 98% |
| 5 | 30 mg ZS + 10 g $NaHCO_3$ + 1 g urea | 11.3 | 99% |
| 6 | 25 mg ZS + 4 g $NaHCO_3$ + 4 g urea | 11.6 | 98% |
| 7* | 50 mg ZS + 8 g $NaHCO_3$ | 8.5 | 98% |
| 8* | 50 mg ZS + 4 g $NaHCO_3$ + 4 g $Na_2CO_3$ | 8.8 | 96% |

Note: *Before the beginning of the test the pH was reduced to 10 by addition of acid (hydrochloric acid)

In an autoclave, 40 ml of Na-aluminate solution (50 g of gibbsite in 1 to 3.6 m NaOH) at 180° C. was stirred with the specified additives for 3 to 4 hours. Before the beginning of the test the pH was reduced to 11 by the addition of acid (hydrochloric acid).

TABLE III

| Example | Additive | pH | Yield |
|---|---|---|---|
| 9 | 50 mg ZS + 8 g $NaHCO_3$ | — | 97% |
| 10 | 25 mg ZS + 8 g $NaHCO_3$ | — | 96% |
| 11 | 10 mg ZS + 8 g $NaHCO_3$ | — | 98% |

I claim:

1. Process for producing dawsonite with a short-prismatic, isometric crystal habit, comprising reacting aluminum hydroxide with sodium carbonate and/or sodium bicarbonate or reacting an aqueous sodium aluminate solution with sodium carbonate and/or sodium bicarbonate and/or urea, either reaction taking place in the presence of at least one hydroxycarboxylic acid and/or at least one salt thereof.

2. Process according to claim 1 wherein citric acid, malic acid, tartaric acid, a salt thereof or mixtures of such hydroxycarboxylic acids and/or their salts are used as the hydroxycarboxylic acid.

3. Process according to claim 2 wherein citric acid is used.

4. Process according to claim 3 wherein the hydroxycarboxylic acid is added in a concentration of 5 to 200 percent per unit by weight of Al in the Al compound used.

5. Process according to claim 4 wherein the hydroxycarboxylic acid is used in a concentration of 5 to 100 percent per unit by weight of Al in the Al compound used.

6. Process according to claim 5 wherein the reaction is performed at a temperature of 150° to 220° C.

7. Process according to claim 6 wherein the reaction is performed at a temperature of 170° to 190° C.

8. Process according to claim 7 wherein the reaction takes place in a pH range of 8 to 13.

9. Process according to claim 1 wherein the aluminum hydroxide is reacted with at least the stoichiometric quantity of an at least 1.5 molar aqueous solution of sodium carbonate and/or sodium bicarbonate.

10. Process according to claim 9 wherein the aluminum hydroxide is reacted with at least the stoichiometric quantity of a 2 to 5 molar aqueous solution of sodium carbonate and/or sodium bicarbonate.

11. Process according to claim 1 wherein the sodium aluminate solution is formed from an aluminum hydroxide with an aqueous sodium hydroxide solution.

12. Process according to claim 11 wherein the resultant short-prismatic, isometric dawsonite crystals exhibit a length in crystallographic direction in the range of 0.1 to 2 micrometers.

13. Process according to claim 1 wherein the hydroxycarboxylic acid is added in a concentration of 5 to 200 percent per unit by weight of Al in the Al compound used.

14. Process according to claim 1 wherein the hydroxycarboxylic acid is used in a concentration of 5 to 100 percent per unit by weight of Al in the Al compound used.

15. Process according to claim 1 wherein the reaction is performed at a temperature of 150° to 220° C.

16. Process according to claim 1 wherein the reaction is performed at temperature of 170° to 190° C.

17. Process according to claim 1 wherein the reaction takes place in a pH range of 8 to 13.

18. Process according to claim 1 wherein the aluminum hydroxide is reacted with at least the stoichiometric quantity of a 2 to 5 molar aqueous solution of sodium carbonate and/or sodium bicarbonate.

19. Process according to claim 1 wherein the resultant short-prismatic, isometric dawsonite crystals exhibit a length in crystallographic c direction in the range of 0.1 to 2 micrometers.

* * * * *